US012732471B2

(12) United States Patent
Pisharody

(10) Patent No.: US 12,732,471 B2
(45) Date of Patent: Sep. 8, 2026

(54) METHODS FOR OPTIMIZING RESOURCE USAGE OF AN APPLICATION AND DEVICES THEREOF

(71) Applicant: F5, Inc., Seattle, WA (US)

(72) Inventor: Vinod Pisharody, San Jose, CA (US)

(73) Assignee: F5, Inc., Seattle, WA (US)

( * ) Notice: Subject to any disclaimer, the term of this patent is extended or adjusted under 35 U.S.C. 154(b) by 42 days.

(21) Appl. No.: 18/896,654

(22) Filed: Sep. 25, 2024

(65) Prior Publication Data

US 2026/0089121 A1 Mar. 26, 2026

(51) Int. Cl.
*H04L 47/70* (2022.01)
*H04L 47/72* (2022.01)

(52) U.S. Cl.
CPC ............ *H04L 47/822* (2013.01); *H04L 47/72* (2013.01)

(58) Field of Classification Search
None
See application file for complete search history.

(56) References Cited

U.S. PATENT DOCUMENTS 1,147,373 A 7/1915 Clark
1,302,020 A 4/1919 Dittbrenner
8,126,722 B2 2/2012 Robb
8,185,475 B2 5/2012 Hug
8,370,407 B1 2/2013 Devarajan
8,572,733 B1 10/2013 Rockwood
8,832,804 B1 9/2014 Casey
8,843,925 B1 * 9/2014 Beda, III et al. ... G06F 9/45558 718/1

(Continued)

FOREIGN PATENT DOCUMENTS

JP 7214287 B1 * 1/2023 ........... G06F 9/5027
WO 2010043722 A1 4/2010

(Continued)

OTHER PUBLICATIONS

Choi et al., "Lambs NIC: interactive Serverless Compute on Programmable SmartNICs", 2020 IEEE 4oth International Conference on Distributed Computing Systems, Nov. 29, 2020, IEEE Publishing.

(Continued)

*Primary Examiner* — Phyllis A Book
(74) *Attorney, Agent, or Firm* — Troutman Pepper Locke LLP

(57) ABSTRACT

Methods, network traffic manager apparatuses, non-transitory computer readable media, and systems that optimize resource usage of an application running in a network traffic management system are disclosed. The method monitors a usage of execution resource by one of a plurality of application functions of the application during the running of the application to obtain resource usage data of the application function, the plurality of application functions being separately allocated resource for executing the plurality of application functions. The method stores the resource usage data and detects a restart of the application. In response to the detection of the restart of the application, the method further retrieves the stored resource usage data of the application function and adjusts resources to be allocated to the application function at the restart of the application based on the resource usage data.

20 Claims, 9 Drawing Sheets

(56) References Cited

U.S. PATENT DOCUMENTS 8,943,548 B2 1/2015 Drokov
8,943,588 B1 1/2015 Speegle
9,055,093 B2 6/2015 Borders
9,077,709 B1 7/2015 Dall
9,221,340 B2 12/2015 Byers
9,237,021 B2 1/2016 Mills
9,325,697 B2 4/2016 Datta
9,338,007 B1 5/2016 Doshi
9,356,883 B1 * 5/2016 Borthakur ........... H04L 41/5025
9,397,990 B1 7/2016 Taly
9,438,419 B1 9/2016 Aggarwal
9,444,916 B2 9/2016 Backholm
9,578,055 B1 2/2017 Khanal
9,589,114 B2 3/2017 Strom
9,628,499 B1 4/2017 Yu
9,654,485 B1 5/2017 Neumann
9,705,895 B1 7/2017 Gutzmann
9,705,902 B1 7/2017 Call
9,800,602 B2 10/2017 Shekyan
9,900,344 B2 2/2018 Smith
9,967,250 B2 5/2018 Johansson
10,534,629 B1 1/2020 St. Pierre
11,392,417 B2 7/2022 Bolkhovitin
2002/0116615 A1 8/2002 Nguyen
2003/0004882 A1 1/2003 Holler
2003/0009538 A1 1/2003 Shah
2003/0042439 A1 3/2003 Rusu
2003/0073091 A1 4/2003 Krylov
2003/0145232 A1 7/2003 Poletto
2003/0182447 A1 9/2003 Schilling
2003/0199762 A1 10/2003 Fritz
2004/0037326 A1 2/2004 Scott
2004/0103283 A1 5/2004 Horak
2004/0170123 A1 9/2004 Carpenter
2005/0027846 A1 2/2005 Wolfe
2005/0111367 A1 5/2005 Jonathan Chao
2005/0195840 A1 9/2005 Krapp
2005/0198519 A1 9/2005 Tamura
2005/0278547 A1 12/2005 Hyndman
2006/0031483 A1 2/2006 Lund
2006/0031928 A1 2/2006 Conley
2006/0098675 A1 5/2006 Okuno
2006/0288411 A1 12/2006 Garg
2007/0118894 A1 5/2007 Bhatia
2007/0204065 A1 8/2007 Harton
2007/0219917 A1 9/2007 Liu
2007/0280114 A1 12/2007 Chao
2007/0294187 A1 12/2007 Scherrer
2008/0010207 A1 1/2008 Yanagihara
2008/0028467 A1 1/2008 Kommareddy
2008/0059797 A1 3/2008 Tokuno
2008/0082662 A1 4/2008 Dandliker
2008/0196099 A1 8/2008 Shastri
2008/0263215 A1 10/2008 Schnellbaecher
2008/0320567 A1 12/2008 Shulman
2009/0052330 A1 2/2009 Matsunaga
2009/0167520 A1 7/2009 Watanabe
2009/0172162 A1 7/2009 Wood
2009/0199297 A1 8/2009 Jarrett
2009/0241173 A1 9/2009 Troyansky
2009/0241174 A1 9/2009 Rajan
2009/0265784 A1 10/2009 Waizumi
2010/0017627 A1 1/2010 Princen
2010/0031315 A1 2/2010 Feng
2010/0070451 A1 3/2010 Hugues
2010/0070620 A1 3/2010 Awadallah
2010/0088752 A1 4/2010 Nagulakonda
2010/0284282 A1 11/2010 Golic
2010/0312875 A1 12/2010 Wilerson
2010/0325418 A1 12/2010 Kanekar
2011/0012586 A1 1/2011 Montanari
2011/0072516 A1 3/2011 Cohen
2011/0083181 A1 4/2011 Nazarov
2011/0138463 A1 6/2011 Kim
2011/0154026 A1 6/2011 Edstrom
2011/0197177 A1 8/2011 Mony
2011/0264621 A1 10/2011 Burjoski
2011/0264905 A1 10/2011 Ovsiannikov
2011/0280160 A1 11/2011 Yang
2012/0017090 A1 1/2012 Gould
2012/0023090 A1 1/2012 Holloway
2012/0079592 A1 3/2012 Pandrangi
2012/0090030 A1 4/2012 Rapaport
2012/0110646 A1 5/2012 Ajitomi
2012/0117621 A1 5/2012 Kondamuru
2012/0144487 A1 6/2012 Kim
2012/0167210 A1 6/2012 Oro Garcia
2012/0173710 A1 7/2012 Rodriguez
2012/0203904 A1 8/2012 Niemela
2012/0233665 A1 9/2012 Ranganathan
2012/0254386 A1 10/2012 Smith
2012/0323700 A1 12/2012 Aleksandrovich
2013/0080407 A1 3/2013 Levow
2013/0081129 A1 3/2013 Niemela
2013/0097605 A1 * 4/2013 Martinka ............ G06F 12/0276 718/100
2013/0174277 A1 7/2013 Kiukkonen
2013/0276114 A1 10/2013 Friedrichs
2014/0007097 A1 * 1/2014 Chin ..................... G06F 9/5077 718/1
2014/0040993 A1 2/2014 Lorenzo
2014/0090071 A1 3/2014 Salehie
2014/0095865 A1 4/2014 Yerra
2014/0157405 A1 6/2014 Joll
2014/0181922 A1 6/2014 Jakobsson
2014/0230051 A1 8/2014 Vallinayagam
2014/0289854 A1 9/2014 Mahvi
2014/0298419 A1 10/2014 Boubez
2014/0317739 A1 10/2014 Tal
2014/0337954 A1 11/2014 Ahmed
2014/0373088 A1 12/2014 Aggarwal
2015/0026766 A1 1/2015 Holloway
2015/0052081 A1 * 2/2015 Duron ................. G06Q 50/184 705/418
2015/0067328 A1 3/2015 Yin
2015/0088662 A1 3/2015 Noller
2015/0128236 A1 5/2015 Moscicki
2015/0163234 A1 6/2015 Tal
2015/0215334 A1 7/2015 Bingham
2015/0271179 A1 9/2015 Wang
2015/0295945 A1 10/2015 Canzanese, Jr.
2015/0310196 A1 10/2015 Turgeman
2015/0341379 A1 11/2015 Lefebvre
2015/0350186 A1 12/2015 Chan
2016/0014119 A1 1/2016 Inoue
2016/0021117 A1 1/2016 Harmon
2016/0057140 A1 2/2016 Heeter
2016/0065579 A1 3/2016 Chen
2016/0080345 A1 3/2016 Safruti
2016/0080412 A1 3/2016 Smith
2016/0127406 A1 5/2016 Smith
2016/0173402 A1 * 6/2016 Broussard ........... G06F 11/3409 709/224
2016/0328715 A1 11/2016 Gideoni
2016/0352774 A1 12/2016 Akcin
2016/0359658 A1 12/2016 Yadav
2016/0381022 A1 12/2016 Jackson
2017/0006033 A1 1/2017 Stecher
2017/0063923 A1 3/2017 Yang
2017/0163565 A1 * 6/2017 Moran, Jr. ............ H04L 47/822
2017/0171231 A1 6/2017 Reybok, Jr.
2017/0208483 A1 7/2017 Chmiel
2017/0249306 A1 8/2017 Allen
2017/0318053 A1 11/2017 Singh
2017/0329390 A1 * 11/2017 Shah ..................... G06F 9/4418
2018/0060107 A1 3/2018 Hu
2018/0124110 A1 5/2018 Hunt
2018/0124300 A1 5/2018 Brook
2018/0152356 A1 5/2018 Dhariwal
2019/0238554 A1 8/2019 Disraeli
2019/0370049 A1 12/2019 Gopalan
2019/0384642 A1 12/2019 Bolkhovitin
2020/0142674 A1 5/2020 Herman et al.
2021/0019159 A1 1/2021 Lu

(56) References Cited

U.S. PATENT DOCUMENTS

| | | | | |
|---|---|---|---|---|
| 2021/0117249 | A1 | 4/2021 | Doshi | |
| 2021/0263779 | A1 | 8/2021 | Haghighat | |
| 2021/0303328 | A1* | 9/2021 | Soppin | G06F 9/5005 |
| 2022/0103613 | A9 | 3/2022 | Palladino et al. | |
| 2022/0197773 | A1 | 6/2022 | Butler | |
| 2023/0145437 | A1 | 5/2023 | Costa | |
| 2023/0305892 | A1* | 9/2023 | Mathew | H04L 41/5025 |
| 2024/0184748 | A1* | 6/2024 | Mapp | G06F 11/3409 |
| 2025/0293935 | A1* | 9/2025 | Alluboyina | G06F 9/5072 |
| 2025/0293937 | A1* | 9/2025 | Alluboyina | H04L 41/12 |
| 2025/0310182 | A1* | 10/2025 | Alluboyina | H04L 12/12 |

FOREIGN PATENT DOCUMENTS

| | | | | |
|---|---|---|---|---|
| WO | 2017016454 | A1 | 2/2017 | |
| WO | WO-2024123338 | A1* | 6/2024 | G06F 9/5066 |

OTHER PUBLICATIONS

Han et al., "Refining Microservices Placement Employing Workload Profiling OVer Multiple Kubernetes Clusters", IEEE Acess, Oct. 22, 2020, IEEE Publishing.
Yen et al., "Meeting SLOs in cross-platform NFV", Proceedings of the 16th International Conference on emerging Networking Experiments Technlogies, Nov. 2020.
EP Application No. 21211849.1, Office Action dated May 10, 2023.
Search Report dated Apr. 13, 2022 for EP Application 21211849.1.
Kayal Paridhika.: "Kubernetes in Fog Computing: Feasibility Demonstration, Limitations and Improvement Scope: Invited Paper", 2020 IEEE 6th World Forum on Internet of Things (WF-iOT), iEEE, Jun. 2, 2020 (May 2, 2020), pp. 1-6, XP033840977, DOI: 10.1.109/WF-IOT48.1302020.9221340.
BIG-IP ASM Operations Guide, Version 14.0, F5 Networks, Inc., pp. 1-102, Dec. 2018.
BIG-IP ASM, Version 11.6.1, Release Notes, F5 Networks, Inc., pp. 1-18, Jun. 13, 2016.
Big-IP® Access Policy Manager Implementations, Version 13.0, F5 Networks, Inc. (2017).
BIG-IP® Analytics: Implementations, Version 11.3, Publication No. MAN-0357-03, F5 Networks, Inc., pp. 1-40 Nov. 15, 2012.
BIG-IP® Analytics: Implementations, Version 11.5, Publication No. MAN-0357-05, F5 Networks, Inc., pp. 1-50, Aug. 25, 2015.
BIG-IP® Application Security Manager TM: Gelling Started, Version 11.6, Publication No. MAN-0285-09, F5 Networks, Inc., pp. 1-78, Aug. 20, 2014.
BIG-IP® Application Security Manager Tm: Gelling Started, Version 12.1, Publication No. MAN-0285-11, F5 Networks, Inc., pp. 1-70, Jul. 11, 2017.
BIG-IP® Application Security Manager TM: Implementations, Version 11.5, Publication No. MAN-0358-06, F5 Networks, Inc., pp. 1-396, Jan. 27, 2014.
BIG-IP® Application Security Manager TM: Implementations, Version 11.6, Publication No. MAN-0358-07, F5 Networks, Inc., pp. 1-420, Aug. 20, 2014.
BIG-IP® Application Security Manager Tm: Implementations, Version 12.1, Publicaiton No. MAN-0358-09, F5 Networks, Inc., pp. 1-388, Sep. 29, 2017.
BIG-IP® Application Security Manager Tm: Implementations, Version 13.0, Publication No. MAN-0358-10, F5 Networks, Inc., pp. 1-348. Nov. 10, 2017.
BIG-IP® CGNAT: Implementations, MAN-0285-05, Version 12.1, F5 Networks, Inc., Mar. 7, 2018, pp. 1-178.
BIG-IP® CGNAT: Implementations, MAN-0428-06, Version 13.0, F5 Networks, Inc., Aug. 29, 2018, pp. 1-206.
BIG-IP® DNS Services: Implementations, Version 11.3, Publication No. MAN-0446-00, F5 Networks, Inc., pp. 1-76, Feb. 5, 2016.
BIG-IP® DNS Services: Implementations, Version 11.5, Publication No. MAN-0446-02, F5 Networks, Inc., pp. 1-156, Jan. 27, 2014.
BIG-IP® Global Traffic Manger: Implementations, Version 11.4, Publication No. MAN-0388-03, F5 Networks, nc., pp. 1-106, Feb. 21, 2014.
BIG-IP® Local Traffic Management: Basics, Version 11.6, Publication No. MAN-0538-00, F5 Networks, Inc., pp. 1-74, Mar. 17, 2016.
BIG-IP® Local Traffic ManagerTm: Concepts, Version 11.4., Publication No. MAN-0377-05, F5 Networks, Inc, pp. 1-178, Sep. 26, 2013.
BIG-IP® Local Traffic Manager Tm: Implementations, Version 11.4, Publication No. MAN-0293-08, F5 Networks, nc., Nov. 19, 2014; 209 pages.
BIG-IP® Local Traffic ManagerTm: Monitors Reference, Version 11.4, Publication No. MAN 0470-00, F5 Networks, Inc., pp. 1-106, Nov. 26, 2013.
BIG-IP® Network Firewall: Policies and Implementations, Version 11.6, Publication No. MAN-0439-04, F5 Networks, Inc., pp. 1-166, Aug. 20, 2014.
BIG-IP® System and SafeNet® Luna SA HSM: Implementations, Version 11.6, Publication No. MAN-0496-01, F5 Networks, Inc., pp. 1-26, Oct. 21, 2016.
BIG-IP® Systems: DoS Protection and Protocol Firewall Implementations, Version 11.6, Publication No. MAN-0440-03, F5 Networks, Inc., pp. 1-108, Aug. 20, 2014.
BIG-IP® TMOS®: Implementations, Version 11.5, Publication No. MAN-0379-05, F5 Networks, Inc., pp. 1-274, Sep. 2, 2014.
BIG-IP® TMOS®: Implementations, Version 12.0, Publication No. MAN-0379-09, F5 Networks, Inc., Dec. J1, 2015; paged 1-264.
E. Hammer-Lahav, Ed. , RFC 5849 "The OAuth 1.0 Protocol", Apr. 2010, Internet Engineering Task Force (IETF), pp. 1-38.
F5 TMOS Operations Guide, Version 12.1, F5 Networks, Inc., Publication No. BIG-IP TMOSOps-02_1, pp. 1-276, Jul. 2016.
Operations Guide 1.0 F5 Local Traffic Manager and Global Traffic Manager, Publication No. BIG-IP TMGTMOps-01_0_0, F5 Networks, pp. 1-144, Dec. 12, 2014.
Rossow et al., "Sandnet: Network Traffic Analysis of Malicious Software," Proceedings of the First Workshop on Building Analysis Datasets and Gathering Experience Returns for Security, pp. 78-88, Apr. 10, 2011.
Tegeler et al., "Bo!Finder: Finding Bots in Network Traffic Without Deep Packet Inspection," CoNEXT '12: Conference Jn Emerging Networking Experiments and Technologies, pp. 349-360. Dec. 10, 2012.
Wang et al., "Engaging Edge Networks in Preventing and Mitigating Undesirable Network Traffic," 2007 3rd IEEE Norkshop on Secure Network Protocols, 6 pp, Oct. 16, 2007.
What is Passwordless?, Azure Active Directory Passwordless Sign In (Preview)—Microsoft Docs, pp. 1-5, Aug. 4, 1019.
Zhang et al., "Boosting the Scalability of Botnet Detection Using Adaptive Traffic Sampling," In Proceedings of the 6th ACM Symposium on Information, Computer and Communications Security, pp. 124-134, Mar. 22, 2011.
European Search Report for European Application No. 24178806, dated Sep. 30, 2024.
UK Search Report for Application No. GB1705857.9, Date of Search Oct. 11, 2017, 1 page.
Choi et al., "Lamba NIC: interactive Serverless Compute on Programmable SmartNICs", 2020 IEEE 40th International Conference on Distributed Computing Systems, Nov. 29, 2020, IEEE Publishing.
Kwon et al., "Design and Prototyping of Container-Enabled Cluster for High Performance Data Analytics", 2019 International Conference on Information Networking, Jan. 9, 2019, IEEE Publishing.
Cong et al., "Customizable computing-From Single Chip to Datacenters", Proceedings of the IEEE (vol. 107, Issue: 1, Jan. 2019), IEEE Publishing.
Kayal Paridhika.: "Kubernetes in Fog Computing: Feasibility Demonstration, Limitations and Improvement Scope: Invited Paper", 2020 IEEE 6th World Forum on Internet of Things (WF-iOT), IEEE, Jun. 2, 2020 (Jun. 2, 2020), pp. 1-6, XP033840977, DOI: 10.1•109/WF-IOT48-1302020.9221340.

(56) References Cited

OTHER PUBLICATIONS

BIG-IP Application Security Manager Operations Guide, Publication No. BIG-IP ASMOps 01_ 1, F5 Networks, Inc., pp. 1-181, Jul. 2016.

BIG-IP ASM, Version 11.5.0, Release Notes, F5 Networks, Inc., pp. 1-44, Apr. 12, 2016.

BIG-IP® Analytics: Implementations, Version 11.6, Publication No. MAN-0357-06, F5 Networks, Inc. pp 1-62, Aug. 24, 2015.

BIG-IP® Applicatin Security Manager Tm: Attack and Bot Signatures, Version 12.1, Publication No. MAN-0578-01, F5 Networks, Inc., pp. 1-50, Nov. 4, 2016.

BIG-IP® TMOS®: Concepts, Version 11.5, Publication No. MAN-0378-04, F5 Networks, Inc., pp. 1-148, May 1, ]014.

D. Hardi, Ed., RFC 6749 "The OAuth 2.0 Authorization Framework", Oct. 2012, Internet Engineering Task Force IETF), pp. 1-76.

Jones et al, RFC 6750 "The OAuth 2.0 Authorization Framework: Bearer Token Usage", Oct. 2012, Internet Engineering Task Force (IETF), pp. 1-18.

Release Note: BIG-IP LTM and TMOS, Version 11.4.1, F5 Networks, Inc., pp. 1-58, Dec. 18, 2014.

Nang et al., "Engaging Edge Networks in Preventing and Mitigating Undesirable Network Traffic," 2007 3rd IEEE Norkshop on Secure Network Protocols, 6 pp, Oct. 16, 2007.

What is Passwordless?, Azure Active Directory Passwordless Sign In (Preview)—Microsoft Docs, pp. 1-5, Aug. 4, J019.

Ihang et al., "Boosting the Scalability of Baine! Detection Using Adaptive Traffic Sampling," In Proceedings of the 6th /\CM Symposium on Information, Computer and Communications Security, pp. 124-134, Mar. 22, 2011.

European Search Report for Application No. 25199247.5, Date of Search Jul. 7, 2026.

European Partial Search Report for Application No. 25199247.5, Date of Search Mar. 4, 2026.

* cited by examiner

METHODS FOR OPTIMIZING RESOURCE USAGE OF AN APPLICATION AND DEVICES THEREOF

FIELD

This disclosure relates to optimize resource usage of an application, in particular, to optimize resource usage of an application running in a network traffic management system.

BACKGROUND

As various wired and wireless technologies rapidly evolve, communication technologies are propelling the world towards a progressively interconnected and networked society. There have been increasingly swift development and deployment of various applications catering to the dynamic needs in different industries. These applications, while being executed in numerous systems, consume significant system resources. Normally, applications have limited resource optimization strategies built into the original design. Even with the limited resource optimization strategies, they are designed based on estimations of operating environments of the applications, such as with all the provided functions being executed. However, an actual deployment could be different from the initial estimation from perspectives such as load characteristic, network characteristic, traffic pattern, etc. Therefore, an actual resource usage of an application may be very different from what that application was originally optimized for, resulting in either under underutilization or over utilization of allocated resources. Given the value and finite nature of these resources, there is a need to optimize the resource usage by applications for improved performance, operational efficiency, and the like.

SUMMARY

This disclosure is directed to methods and devices related to optimizing resource usage of an application. More specifically, the methods and devices relate to optimize resource usage of an application running in a network traffic management system. Relevant non-transitory computer readable medium and network traffic management system are also disclosed.

According to an aspect of the disclosure, a method for optimizing resource usage of an application running in a network traffic management system is disclosed. The method may be implemented by a network traffic management system, wherein the network traffic management system may comprise one or more network traffic management apparatuses, client devices, or network server devices. The method may comprise monitoring a usage of execution resource by one of a plurality of application functions of the application during the running of the application to obtain resource usage data of the application function, the plurality of application functions being separately allocated resource for executing the plurality of application functions. The method may further comprise storing the resource usage data and detecting a restart of the application. The method may further comprise in response to the detection of the restart of the application, retrieving the stored resource usage data of the application function and adjusting a resource to be allocated to the application function at the restart of the application based on the resource usage data.

According to another aspect of the disclosure, an apparatus for optimizing resource usage of an application running in a network traffic management system is disclosed. The apparatus may comprise memory comprising programmed instructions stored in the memory and one or more processors configured to be capable of executing the programmed instructions stored in the memory to: monitor a usage of execution resource by one of a plurality of application functions of the application during the running of the application to obtain resource usage data of the application function, the plurality of application functions being separately allocated resource for executing the plurality of application functions. The one or more processors may store the resource usage data and detect a restart of the application. In response to the detection of the restart of the application, the one or more processors may further retrieve the stored resource usage data of the application function and adjust a resource to be allocated to the application function at the restart of the application based on the resource usage data.

According to another aspect of the disclosure, a non-transitory computer readable medium is disclosed. The non-transitory computer readable medium may have stored thereon instructions for optimizing resource usage of an application running in a network traffic management system, comprising executable code which when executed by one or more processors, causes the one or more processors to monitor a usage of execution resource by one of a plurality of application functions of the application during the running of the application to obtain resource usage data of the application function, the plurality of application functions being separately allocated resource for executing the plurality of application functions. The executable code may further cause the one or more processors to store the resource usage data and detect a restart of the application. In response to the detection of the restart of the application, the executable code may further cause the one or more processors to retrieve the stored resource usage data of the application function and adjust a resource to be allocated to the application function at the restart of the application based on the resource usage data.

According to another aspect of the disclosure, a network traffic management system comprising one or more traffic management apparatuses, server devices, or client devices is disclosed. The network traffic management system may comprise memory comprising programmed instructions stored thereon and one or more processors configured to be capable of executing the stored programmed instructions to: monitor a usage of execution resource by one of a plurality of application functions of the application during the running of the application to obtain resource usage data of the application function, the plurality of application functions being separately allocated resource for executing the plurality of application functions. The one or more processors may further store the resource usage data and detect a restart of the application. In response to the detection of the restart of the application, the one or more processors may further retrieve the stored resource usage data of the application function and adjust a resource to be allocated to the application function at the restart of the application based on the resource usage data.

With implementations of the above and operations that will be discussed below, resources may be allocated to an application function based on its actual usage rather than default configuration under a resource usage estimation. Accordingly, both underutilization and over utilization of resource allocated by a default configuration may be alleviated. Therefore, resource usage of an application running in a system may be optimized.

The above and other aspects and their implementations are described in greater detail in the drawings, the descriptions, and the claims below.

BRIEF DESCRIPTION OF THE DRAWINGS

The foregoing and other aspects of the present disclosure are best understood from the following detailed description when read in connection with the accompanying drawings. For the purpose of illustrating this technology, specific examples are shown in the drawings, it being understood, however, that the examples of this technology are not limited to the specific instrumentalities disclosed. Included in the drawings are the following Figures.

DETAILED DESCRIPTION

Figure 1:
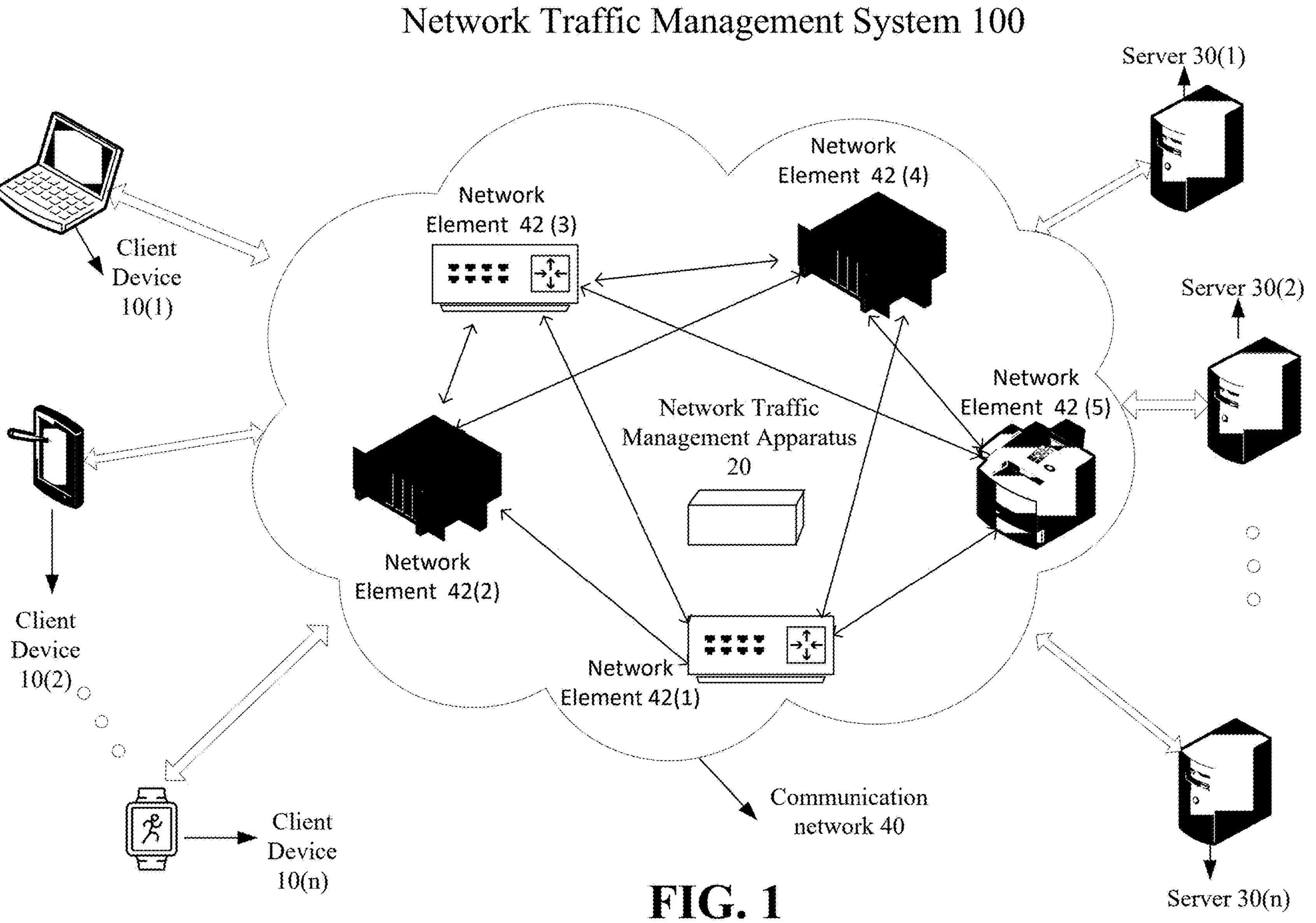
FIG. 1 illustrates an exemplary network traffic management system.

The present disclosure may be understood more readily by reference to the following detailed description of exemplary examples. Before the exemplary implementations and examples of the methods, devices, and systems according to the present disclosure are disclosed and described, it is to be understood that implementations are not limited to those described within this disclosure. Numerous modifications and variations therein will be apparent to those skilled in the art and remain within the scope of the disclosure. It is also to be understood that the terminology used herein is for describing specific implementations only and is not intended to be limiting. Some implementations of the disclosed technology will be described more fully hereinafter with reference to the accompanying drawings. This disclosed technology may, however, be embodied in many different forms and should not be construed as limited to the implementations set forth therein.

In the following description, numerous specific details are set forth. But it is to be understood that examples of the disclosed technology may be practiced without these specific details. In other instances, well-known components, structures, and techniques have not been shown in detail in order not to obscure an understanding of this description. References to "an implementation," "an example," "some examples," etc., indicate that the implementation(s) of the disclosed technology so described may include a particular feature, structure, or characteristic, but not every implementation necessarily includes the particular feature, structure, or characteristic. Further, repeated use of the phrase "in some examples" does not necessarily refer to the same implementation, although it may. Additionally, it is to be understood that particular features, structures, or characteristics that described in different examples, implementations or the like, may be further combined in various ways and being implemented in one or more implementations.

A network traffic management system may relate to a set of tools, processes, devices, and relevant technologies to control and optimize data flow within a computer network. Such network traffic management system may monitor, analyze, control and balance network traffic to maintain the performance and reliability of a computer network. A network traffic management system may be implemented in various network topologies. Devices utilized and topologies designed in a network environment may depend on specific requirements and a scale of a network. Factors may include such as the size of the network, its geographic spread, the types of applications and services being offered, the organization's traffic management requirements, etc. For example, the network traffic management system may be implemented in a centralized, distributed, or cloud-based topology in various networks. The network traffic management system may be executed in various networks, include but not limited to, Local Area Networks (LAN), Wide Area Networks (WAN), Metropolitan Area Network (MAN), data center networks, cloud networks, hybrid networks, or any appropriate existing networks or the ones that may be developed in the future. Various devices may be involved in the network traffic management system, depending on the specific network and topology being used. For example, edge routers or switches, firewalls, proxies, load balancers, Content Delivery Network (CDN) servers, application servers, etc. may be included in a network traffic management system.

An application may refer to any software or program, a series of software or program, or any piece or segment of software or program, that being designed to perform specific task(s) in a system or network (e.g., for an end user of a client device, an application of a network service device, or an application of the network traffic management system, or even for another application), which uses or consumes resources. The application may be executed within a network component, a network device, or any physical or virtual network element in a system. Such application may have one or more than one functions (is also called features). Therefore, an application may comprise a plurality of application functions, i.e., more than one functions. Also, it is to be understood that because an application may be designed to perform a specific function of another application, therefore, functions of such application could be sub-functions of that specific function of that another application. Operations described in this disclosure apply to such sub-functions as well, and therefore covered by the claimed scopes of this disclosure. By way of example, an application may be database application, a web application, non-web application that running in a control plane of a system or network to perform a specific task and thereby provide a function desired thereof.

Resource may refer to any physical or virtual component of limited availability in a computer device, system, a series or cluster of them within which an application or a portion of the application is executed, including but not limited to computing resource, storage resource, network bandwidth, etc. By way of example, the components could be CPU, memory (RAM), disk storage, various hardware devices.

A network traffic management apparatus may refer to an apparatus executing one or more operations as will be described below to optimize resource usage of an application according to various examples of this disclosure. The network traffic management apparatus may monitor resource usage during running of an application, and thereby record and further optimize the resource usage of the application by implementing the one or more operations described in this disclosure. Such network traffic management apparatus may reside in any physical or virtual, single or a cluster of network component or module, network device, appliance, element, or reside in any other device that communicatively connected thereto which is appropriate to implement the operation(s) in this disclosure. By way of example, the network traffic management apparatus may be executed on load balancing device, security device, VPN related device for controlling or facilitate access of an application or service, application device or server, web server, or any backend device or appliance in a network or a system.

A network service device may be any network device that provides a service to a client device, whose traffic data may be processed by and therefore related resource consumed thereof may be optimized by the network traffic management apparatus. The network service device may be implemented in various ways, such as hardware, software, firmware, or any combination thereof. For example, the network service device may be a server (e.g., a web application server) or a cluster of servers of the network traffic management system, or a virtual machine, virtual server, engine, instance or the like that resides at a server or other network elements (e.g., module, component, element, container, pod, etc.).

A client device may refer to any client device that may send or initiate a request to the network service device to establish or continue to a communicative connection with the network service device. Similar as the network service device, the client device may be implemented in various ways, including but not limited to, hardware, software, firmware, or any combination thereof.

FIG. 1 illustrates an exemplary simplified network traffic management system 100 according to an example of this disclosure. As illustrated in FIG. 1, the network traffic management system 100 may comprise a plurality of client devices 10(1)-10(*n*), a communication network 40, and a plurality of servers 30(1)-30(*n*) serving the client devices 10(1)-10(*n*). The client devices 10(1)-10(*n*) and servers 30(1)-30(*n*) may communicatively connect with each other via the communication network 40.

Referring to FIG. 1, as an exemplary implementation of one of the client devices 10(1)-10(*n*) discussed above, one of the client devices 10(1)-10(*n*) may send a request to one of the servers 30(1)-30(*n*) for a service (e.g., via a web browser installed at one of the client devices 10(1)-10(*n*)). The client devices 10(1)-10(*n*) may also be referred to as a "client," "user device," "user equipment," or "user equipment device," which may include but is not limited to a mobile phone, smartphone, tablet, laptop computer, a smart electronics, a wearable device, a video surveillance device, an industrial wireless sensors, or an appliance including an air conditioner, a television, a refrigerator, an oven and the like, or other devices that are capable of communicating wirelessly over a network. Moreover, one or more of the client devices 10(1)-10(*n*) may also be a proxy or a server or any network elements or devices, which may send above discussed request to one of the servers 30(1)-30(*n*) on behalf of a user equipment. For example, one or more of the client devices 10(1)-10(*n*) may be a proxy (e.g., a forward proxy) of a private network, which forwards a request message that it received from a user device isolated within the private network. In this way, the proxy sends a request message on behalf of the isolated device and allows it to be served by one of the servers 30(1)-30(*n*). In this scenario, the proxy plays the role of one of the client devices 10(1)-10(*n*) in the network traffic management system 100 as illustrated in FIG. 1.

Continuing to refer to FIG. 1, as an exemplary implementation of the network service device discussed above, one of the servers 30(1)-30(*n*) may respond to one of the client devices 10(1)-10(*n*) and have one or more interactions with the one of the client devices 10(1)-10(*n*) to provide the requested service or data, in response to receiving the request from the one of the client devices 10(1)-10(*n*) via the communication network 40. The servers 30(1)-30(*n*) may be any types of servers to serve one of the client devices 10(1)-10(*n*). For example, the servers 30(1)-30(*n*) may be application servers that run applications, manage, and execute various tasks related to the processing of one of the client devices 10(1)-10(*n*)'s requests within the network environment. Various services may be provided by the servers 30(1)-30(*n*).

As illustrated in FIG. 1, the communication network 40 may comprise a plurality of network elements 42(1)-42(*n*) to provide connectivity and data transmission. Depending on the topology and features of the communication network 40, there may be various types of network elements 42(1)-42(*n*) (e.g., a router, a proxy, a load balancer, etc.) to perform designated functionalities provided by various applications. As illustrated in FIG. 1, one of the client devices 10(1)-10(*n*) may communicatively connected to the communication network 40. When one of the client devices 10(1)-10(*n*) sends a message to request a service provided by one of the servers 30(1)-30(*n*), the message may go through some of the network elements 42(1)-42(*n*) before reaching its destination. It is to be understood that different network technologies may be applied by the communication network 40. For example, communication network 40 may be one or more wired or wireless public or private networks, based on any industry-standard protocols, such as Ethernet, Wi-Fi, Satellite Networks, 4G/LTE (Long-Term Evolution), 5G, and various internet protocols like TCP/IP. The communication network 40 may also be formed by connecting appropriate number of networks together as needed.

In the network environment illustrated in FIG. 1, to provide a networking connection or a service to one of the client devices 10(1)-10(*n*), various applications may run on the network elements 42(1)-42(*n*) and the servers 30(1)-30(*n*). Some applications may have resource(s) pre-allocated to them due to for example the inherent importance or complexity of the function(s) the applications provide. As an example, a complex application (e.g., applications executed in a high-speed network component) may be designed in a way that assuming all its functions being executed at some time point and requiring a reservation of resource for implementing all those functions to ensure a good performance. However, in an actual execution environment, that application may have only a part of those functions being executed in most cases, with the rest functions being enabled and using up the reserved resources but idle. Therefore, there is a waste of the resource reserved for those enabled but idle functions.

Referring to FIG. 1, by implementing the network traffic management apparatus 20 described in this disclosure at any of the device(s) mentioned above (e.g., reside at any of the network elements 42(1)42(*n*) and/or the servers 30(1)-30(*n*) in the network traffic management system 100), undesired scenarios described above at least may be alleviated to a certain extent. Such network traffic management 20 may be executed to implement one or more operations which will be discussed below, to optimize resource usage.

It is to be understood that FIG. 1 illustrates an exemplary simplified network traffic management system 100 to which many variations may be made. For example, other types and numbers of systems, devices, components, and elements in other topologies may be used to add into the illustrated system or replace any part of the illustrated system. Furthermore, one or more of the components depicted in the network traffic management system 100, such as the network traffic management apparatus 20, may be configured to operate as virtual instances on the same or different physical machine(s). In some scenarios, the network traffic management apparatus 20 may operate as more than one separate devices at different physical devices, and communicatively connected with each other through communication network 40 or other relevant network(s) as needed, rather than operate on the same physical device as illustrated in FIG. 1.

Figure 2:
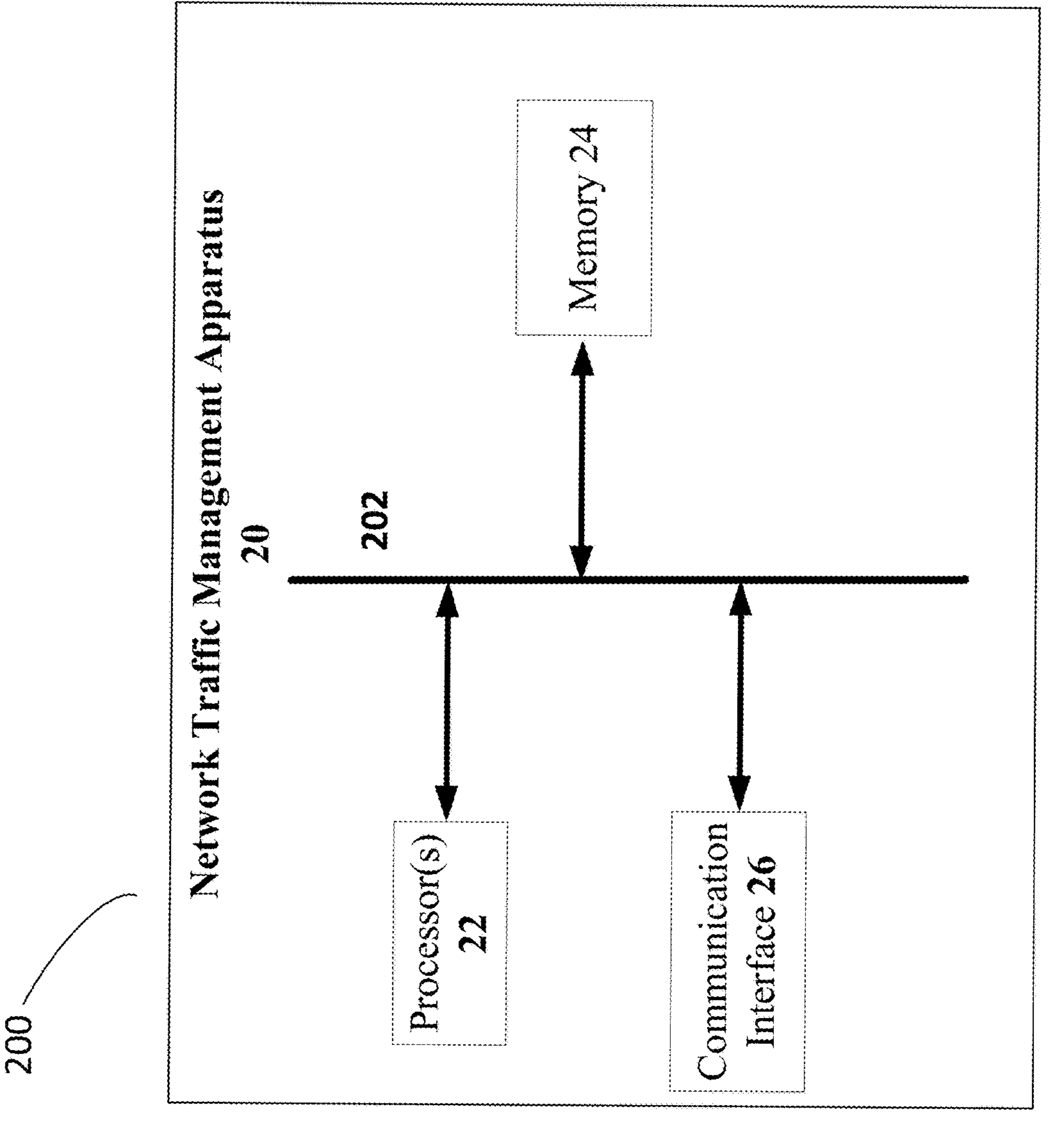
FIG. 2 illustrates an exemplary execution environment of a network traffic management apparatus.

FIG. 2 shows an exemplary execution environment 200 of the network traffic management apparatus 20. In the execution environment 200, the network traffic management apparatus 20 may include processor(s) 22, a memory 24, a communication interface 26 and/or other circuitries, which are coupled together by a bus 202 or other communication link. It is to be understood that the network traffic management apparatus 20 may include other types and/or numbers of elements in other configurations. The processor(s) 22 of the network traffic management apparatus 20 may execute programmed instructions stored in the memory 24 of the network traffic management apparatus 20 for any number of the operations or tasks identified in this disclosure. The processor(s) 22 of the network traffic management apparatus 20 may include one or more central processing units (CPU) or general-purpose processors with one or more processing cores, for example, although other types of processor(s) can also be used. The communication interfaces 26, which may support wireless, e.g., Bluetooth, Wi-Fi, WLAN, cellular (4G, LTE/A, 5G), and/or wired, Ethernet, Gigabit Ethernet, optical networking protocols. The communication interfaces 26 may also include serial interfaces, such as universal serial bus (USB), serial ATA, IEEE 1394, lighting port, I2C, slimBus, or other serial interfaces. In some examples, the execution environment 200 may further include power functions and various input interfaces (not shown in FIG. 2). In some examples, the execution environment 200 may further include a user interface that may include human-to-machine interface devices and/or graphical user interfaces (GUI).

The memory 24 of the network traffic management apparatus 20 may store these programmed non-transitory computer-readable instructions for one or more aspects of the technology as described and illustrated herein, although some or all of the programmed instructions could be stored elsewhere. A variety of different types of memory storage devices, such as random access memory (RAM), read only memory (ROM), Hard Disk Drive (HDD), solid state drives, flash memory, Erasable Programmable Read Only Memory (EPROM), or other computer readable medium such as magnetic or optical disc (e.g., Compact Disc Read Only Memory (CD-ROM)) which is read from and written to by a magnetic, optical, or other machine-readable medium that is coupled to the processor(s) 22, may be used as the memory 24. Accordingly, the memory 24 of the network traffic management apparatus 20 may store application(s) that can include computer executable instructions that, when executed by the network traffic management apparatus 20, cause the network traffic management apparatus 20 to perform actions or operations, such as to transmit, receive, or otherwise process messages, for example, and to perform other actions or operations described and illustrated below with reference to the drawings. An application may be implemented as a unit, module, component, instance, or engine of other applications and/or operating system extensions, plugins, or the like. The application(s) can be executed within or as virtual machine(s) or virtual server(s) that may be managed in a cloud-based computing environment, without being tied to one or more specific physical network devices.

The methods, devices, processing, circuitry, and logic described below may be implemented in many different ways and in many different combinations of hardware, software, firmware, or combination thereof. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium (e.g., memory 24) that is other than a transitory signal. A product, such as a computer program product, may include a storage medium and instructions stored in or on the medium, and the instructions when executed by the circuitry in a device may cause the device to implement any of the processing described above or illustrated in the drawings.

The implementations discussed herein may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Figure 3:
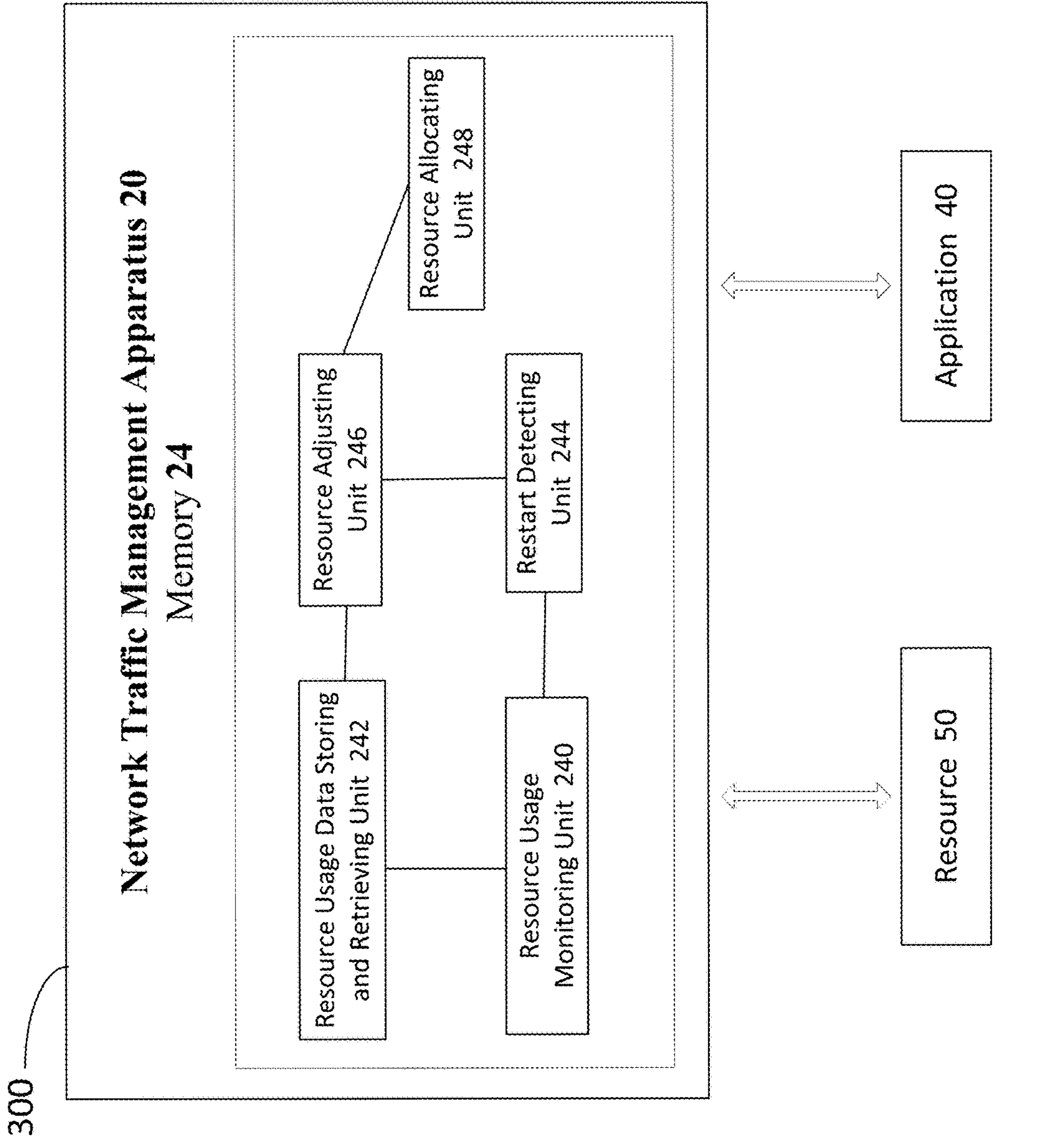
FIG. 3 illustrates an exemplary block diagram of a network traffic management apparatus.

Referring to FIG. 3, an exemplary block diagram of the network traffic management apparatus 20 to optimize resource usage of an application is illustrated. In FIG. 3, the network traffic management apparatus 20 may comprise Resource Usage Monitoring Unit 240, Resource Usage Data Storing and Retrieving Unit 242, Restart detecting Unit 244, Resource Adjusting Unit 246, and Resource Allocating Unit 248. Operations performed by those units will be described in conjunction with the flow diagram illustrated in FIG. 4. Those units described herein may be implemented with various available or appropriate programing APIs, such as JavaScript, Python, etc.

The term "unit" (and other similar terms such as module, submodule, etc.) may refer to computing software, firmware, hardware, and/or various combinations thereof. At a minimum, however, units are not to be interpreted as software that is not implemented on hardware, firmware, or recorded on a non-transitory processor readable recordable storage medium. Indeed, "unit" is to be interpreted to include at least some physical, non-transitory hardware such as a part of a processor, circuitry, or computer. Two different units may share the same physical hardware (e.g., two different units can use the same processor and network interface). The units described herein can be combined, integrated, separated, and/or duplicated to support various applications. Also, a function described herein as being performed at a particular unit can be performed at one or more other units and/or by one or more other devices instead of or in addition to the function performed at the particular unit. Further, the units can be implemented across multiple devices and/or other components local or remote to one another. Additionally, the units can be moved from one device and added to another device, and/or can be included in both devices. The units can be implemented in software stored in memory or non-transitory computer-readable medium. The software stored in the memory or medium can run on a processor or circuitry (e.g., ASIC, PLA, DSP, FPGA, or any other integrated circuit) capable of executing computer instructions or computer code. The units can also be implemented in hardware using processors or circuitry on the same or different integrated circuit.

Figure 4:
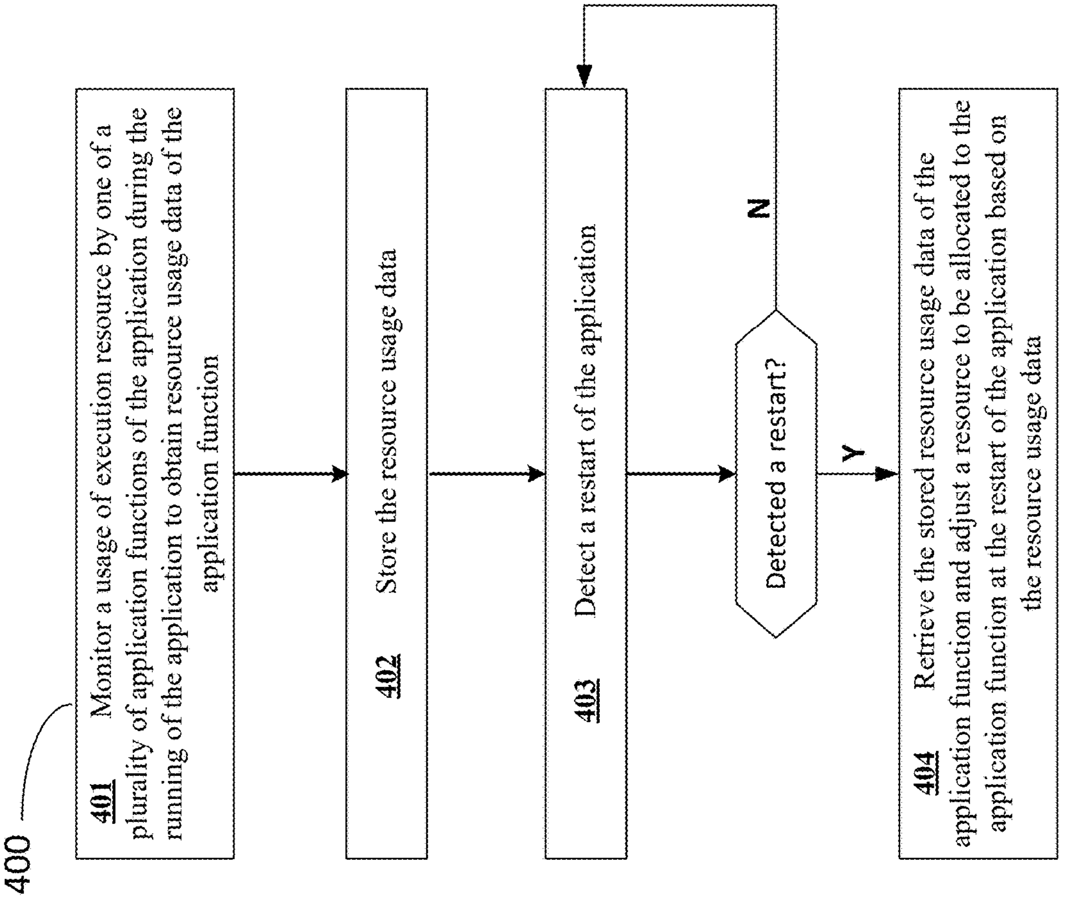
FIG. 4 illustrates a flow diagram of an exemplary method for optimizing resource usage of an application being executed at a network traffic management apparatus.

FIG. 4 illustrates a flow diagram of an exemplary process 400 for optimizing resource usage of an application implemented or executed by the network traffic management apparatus 20. As discussed above, the network traffic management apparatus 20 may be implemented on any appropriate network device or component, or a series or cluster of network device or components. In the following, steps illustrated in FIG. 4 will be described in conjunction with the logic of the network traffic management apparatus 20 shown in FIG. 3.

At step 401, the Resource Usage Monitoring Unit 240 of the network traffic management apparatus 20 may monitor a use of resource 50 by an application 40. Specifically, the Resource Usage Monitoring Unit 240 may monitor a usage of execution resource by a specific application function. In an example, a small amount of resource (e.g., CPU) may be allocated to the Resource Usage Monitoring Unit 240 to perform the monitor task and check if any of resource 50 is in use by an application 40. Such monitor task may be executed by the Resource Usage Monitoring Unit 240 on a real time basis, or periodically (e.g., by sampling), depending on the application or specific application function being monitored. By way of example, for an application or application function having relative stable traffic, monito can be made periodically. As another example, for an application or application function whose traffic or whose executions changes quickly, a real time monitor may be made. This may also depend on the specific deployment of the system in which the application or application function is running, or preferences of an owner or administrator of the application or application function.

Figure 5A:
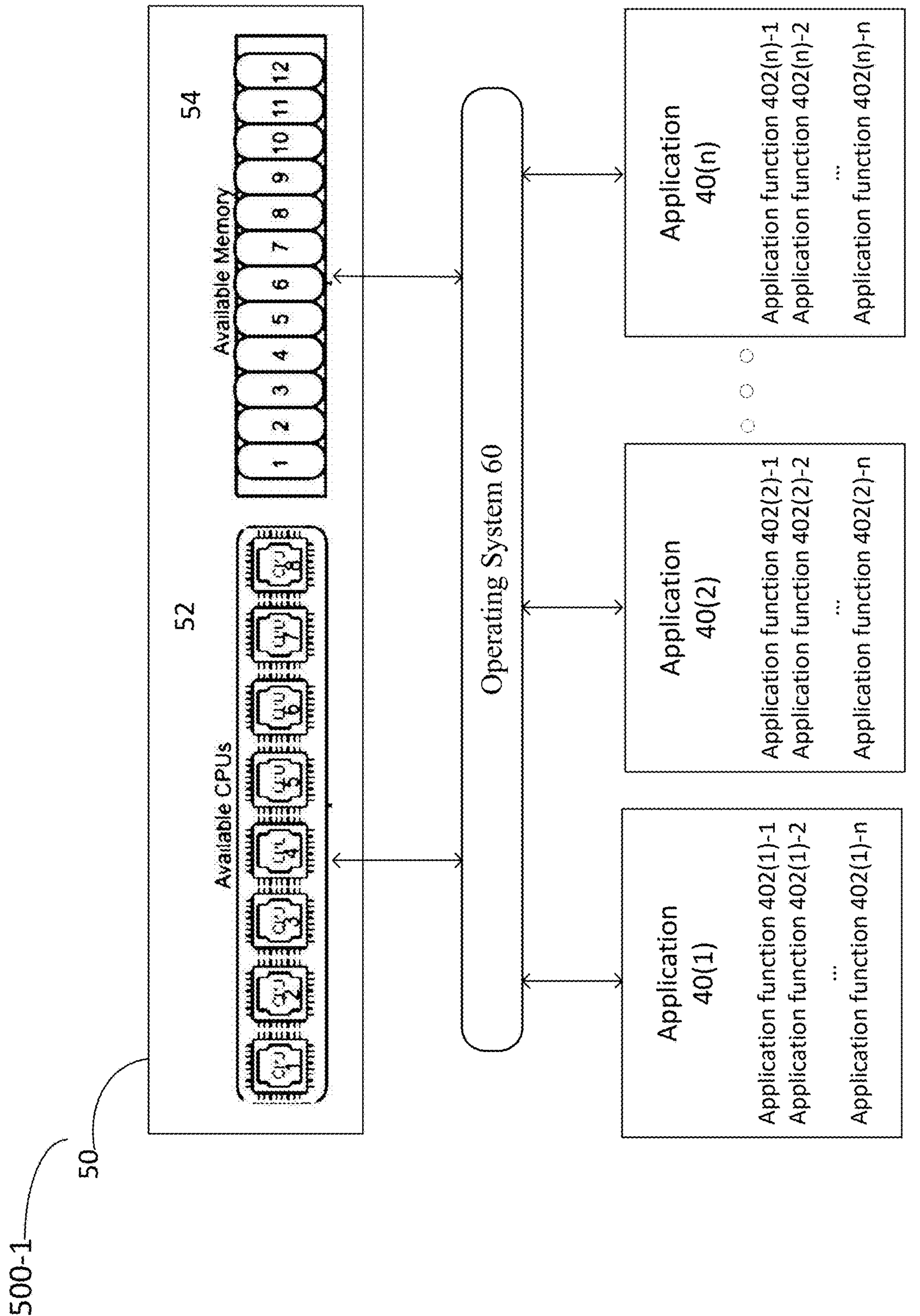
FIGS. 5A-5B illustrate an exemplary resource allocation to an application running in a network traffic management system.
Figure 5B:
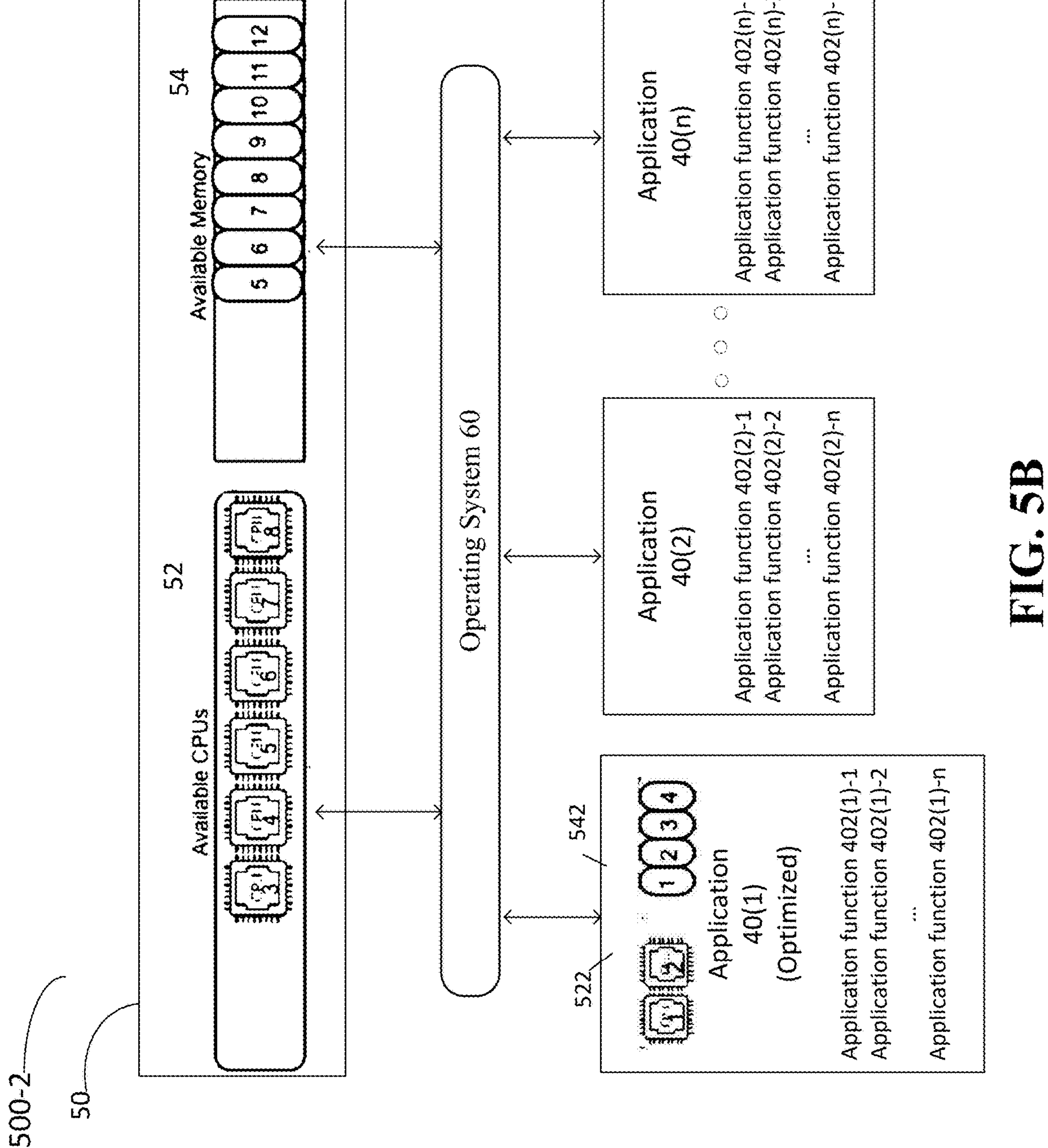

FIGS. 5A-5B illustrate an exemplary resource allocation to an application running in a network traffic management system. As illustrated in FIG. 5A, the resource 50 may comprise CPU resource 52 and memory resource 54 (e.g., memory resources 1 through 12), which can be allocated by operating system 60 to one or more applications 40(1)-(*n*). The operating system 60 may manage the resource 50 and decide how to allocate resource 50 among the applications 40(1)-(*n*) for implementing various tasks as needed. As described above, each of the applications 40(1)-(*n*) may comprise one or more application functions. When any of the applications 40(1)-(*n*) or application functions 402(1)-1 to 402(*n*)-*n* is executed in the system 500-1, a part of the resource 50 may be allocated as needed (e.g., malloc). Such allocation of the resource 50 may be on an application basis, or on an application function basis. In other words, the operating system 60 may allocate specific resource to a particular application of applications 40(1)-40(*n*), or to a particular application function of the application functions 402(1)-1 to 402(*n*)-*n*. The resource allocation illustrated in FIG. 5A may be made in a flexible way and therefore could optimize the resource usage but requires more operations by the operating system 60.

FIG. 5B illustrates a different manner of the resource allocation. As illustrated in FIG. 5B, instead of allocating resource 50 when determining one of the applications 40(1)-(*n*) or one of application functions 402(1)-1 to 402(*n*)-*n* being executed, the operating system 60 may allocate a part of the resource 50 to an application 40(1) in advance. As illustrated in FIG. 5B, the operating system 60 allocated memory resource 54 (numbers 1 through 4) to memory 542 along with some available CPU 52 to the resource CPU 522. By allocating available CPU 52 and memory resource 54 in advance, the operating system 60 reserves this part of resource 50 for application 40(1), which may be considered as a resource pool of application 40(1). Then when application 40(1) is executed, there is no need for the operating system 60 to further allocate resource 50. In FIG. 5B, for the rest of the applications 40(2)-40(*n*), the operating system 60 does not reserve any part of resource 50 for them in advance. It is to be understood that, alternatively, the operating system 60 may designate a part or all the resource CPU 522 and memory 542 to any particular application function 402(1)-1 to 402(1)-*n* of the application 40(1). It is to be understood that as for which application(s) 40(1)-(*n*) may have reserved resource, or whether specific application function(s) of application functions 402(1)-1 to 402(*n*)-*n* may have reserved resource, the operating system 60 may make a determination as needed, or depend on characteristics of the system and the applications thereof. The resource reserved herein may be specific amount, or specific type, or even specific portion of resource 50. As for the resource reservation as illustrated in FIG. 5B, the application 40(1) may under use its resource pool (i.e., too many resource being reserved for it) or overuse (i.e., too less resource being reserved) which can cause memory thrashing. However, by reserving a part of resource 50 to application 40(1) in advance, less interactions and operations by the operating system 60 during the running of application 40(1) may be needed. Accordingly, reserving resource in advance may be used for improving performance of the system.

Referring back to FIGS. 3-4, the Resource Usage Monitoring Unit 240 may monitor the resource usage for each of application functions of every application, or some of the application functions of some of the applications. At the first time that an application being executed to run in a system, that application may run with its default configuration. In other words, the application may obtain resource that the operating system 60 reserves for it by the default configuration (e.g., default size of a memory pool such as the scenario illustrated in FIG. 5B), or resource that the operating system 60 allocates to it when determining or detecting its running (e.g., as illustrated in FIG. 5A). Therefore, it is to be understood that the resource consumed or used by any specific application function may be any portion of the resource 50, either reserved resource(s) or non-reserved resource(s). During the running of the application, the Resource Usage Monitoring Unit 240 may obtain resource usage data of an application function. Accordingly, the obtained resource usage data is associated with a specific application function. By monitoring the resource usage, any use of the monitored resource 50 and therefore execution environment change (e.g., a change in traffic pattern) of the application function may be monitored by the Resource Usage Monitoring Unit 240.

At step 402, the Resource Usage Data Storing and Retrieving Unit 242 of the network traffic management apparatus 20 may store the resource usage data, which may reflect any use of resource 50 that monitored by the Resource Usage Monitoring Unit 240. The resource usage data may be stored by the Resource Usage Data Storing and Retrieving Unit 242 in a storage of the network traffic management apparatus 20 (e.g., memory 24) or a storage communicatively connected to the network traffic management apparatus 20.

It's to be understood that there are different ways to carry out the storing operation. In some examples, the resource usage data comprise a resource use count of resource allocated to the application function. By way of example, a resource use count may be assigned for a minimum resource allocation unit (e.g., memory object such as memory pool no. 1, type 1, CPU pool no. 2, type 1, etc.). Then the resource use count may be increased by one as a response to detecting a use of that resource allocation unit by the application function, which may be monitored by the Resource Usage Monitoring Unit 240. Then the resource use count may indicate how much of an associated resource is used over time. This allows an adjustment of resource to be allocated to that application function at the restart of the application based on such resource use count, which will be described in the following. This is a cost-effective and easy to implement manner to collect the resource usage information and reflect the resource usage in a straightforward way. For example, an operation in a CPU may be performed to detect the resource usage to increase the value of the resource use count. In some further examples, the resource usage data may be maintained and stored by creating logs for system resource. In this situation, logs can be stored in a storage (e.g., of the network traffic management apparatus 20 or other appropriate network component or device) for a further analysis.

As discussed above, the resource usage data may reflect how frequently an application function is executed during the running of the application, what resource(s) are being used by the application function, and how much resource is being used. For example, the resource usage data may include data that shows which specific type(s) of memory 54 has been used by which application function(s), how long has it been used, how much has been used (e.g., monitored by a wrapper around memory allocators, which can be implemented as a part of the Resource Usage Monitoring Unit 240). In some other examples, the resource usage data may comprise information indicating how long has an application function run, i.e., its running time. In some other examples, the resource usage data may comprise load information indicating a load characteristic of an application function, such as maximum, average, or minimum of active users, concurrent connections, or length of connections for an application function. In some other examples, the resource usage data may comprise information about timing conditions or status related to resource usages (e.g., load or traffic characteristics), such as when did a high load for a specific application function occur, how long did this last, or the like. In some other examples, the resource usage data may comprise information about network conditions or status, such as maximum, average, or minimum values of network latency, throughput, data packet size, network error, or the like. In some other examples, the resource usage data may comprise information about encryption suite(s) that negotiated and used thereof. In some further examples, the resource usage data may comprise any combination(s) of the exemplary information discussed above.

At step 403, the Restart detecting Unit 244 of the network traffic management apparatus 20 may detect a restart of the application. It is to be understood that a restart of an application may happen in various scenarios. By way of example, a restart may occur due to a system or network operating status (e.g., an error or anomaly), a maintenance plan scheduled for an application in advance or as needed, a new function to be deployed to the application, an update or revision of the application, or any other change of the development, deployment or execution of the application (e.g., load characteristics, network characteristics, etc.) which indicates an necessity of a restart.

At step 404, in response to the detection of the restart of the application, the Resource Usage Data Storing and Retrieving Unit 242 may retrieve the stored resource usage data of an application function, and the Resource Adjusting Unit 246 of the network traffic management apparatus 20 may adjust a resource to be allocated to the application function accordingly. It is to be understood that in response to the detection of the restart of the application, the Resource Usage Data Storing and Retrieving Unit 242 may retrieve and the Resource Adjusting Unit 246 of the network traffic management apparatus 20 may adjust a resource to be allocated for each application function of that application, whose resource usage is monitored by the Resource Usage Monitoring Unit 240. In this way, every time an application restarts, resource usage by this application may be optimized by the network traffic management apparatus 20 based on the monitored resource usage during the previous running(s). Then the Resource Allocating Unit 248 of the network traffic management apparatus 20 may allocate the adjusted resource to the application function 402.

In some examples, the adjustment made by the Resource Adjusting Unit 246 may be based on resource usage data monitored during the immediate previous running of the application. In this way, an adjustment of resource allocated to the application may be made and thereby the resource usage may be optimized timely in a responsive manner, accommodating to the latest actual resource needs of the application.

In some other examples, the adjustment can be made based on resource usage data monitored over predetermined number of running of the application (e.g., resource usage data stored during four or five running, which means the application restarted four or five times), or over certain period of running time (e.g., certain number of weeks, months, or even years of running of application). This means adjustment made by the Resource Adjusting Unit 246 is based on accumulated resource usage data for a longer time, as compared to the immediate previous running scenario. Then such adjustment may be more robust and may be a preferred manner for an application that has a higher performance requirement or more stable amount of traffic to process.

Figure 6A:
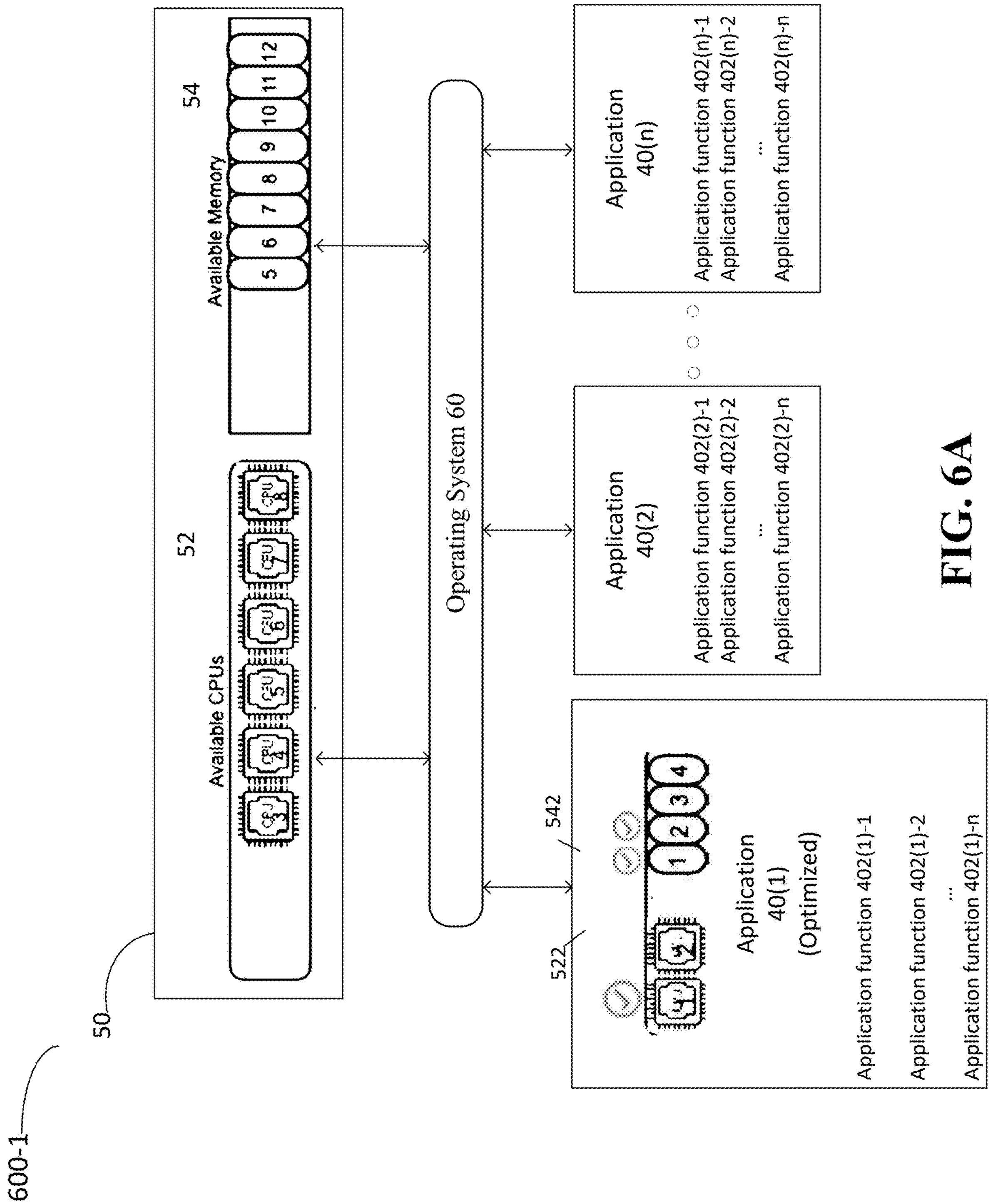
FIG. 6A illustrates an exemplary resource usage of an application, on application function basis, during running in a network traffic management system.

FIG. 6A illustrates an exemplary resource usage of an application, on application function basis, during running in a network traffic management system. As shown in scenario 600-1 in FIG. 6A, operating system 60 reserves CPU resource 522 and memory resource 542 (with available memory resources 1 through 4) for application 40(1) as its own pre-allocated resource pool. However, during running of application 40(1) in the system, based on the resource usage monitored by the Resource Usage Monitoring Unit 240 and the resource usage data recorded and stored by the Resource Usage Data Storing and Retrieving Unit 242, only a part of the reserved resource is used or consumed (as illustrated by the check marks above the CPU resource 522 and the memory resource 542). Specifically, only application function 402(1)-1 used the part of the reserved resource with check marks, while other application function 402(1)-2 through 402(1)-n did not use any of the reserved resources. In other words, only application function 402(1)-1 was executed during the previous running of application 40(1). Based on such underutilization of the reserved resource, resource reserved for application 40(1) may be adjusted after a restart of application 40(1).

Figure 6B:
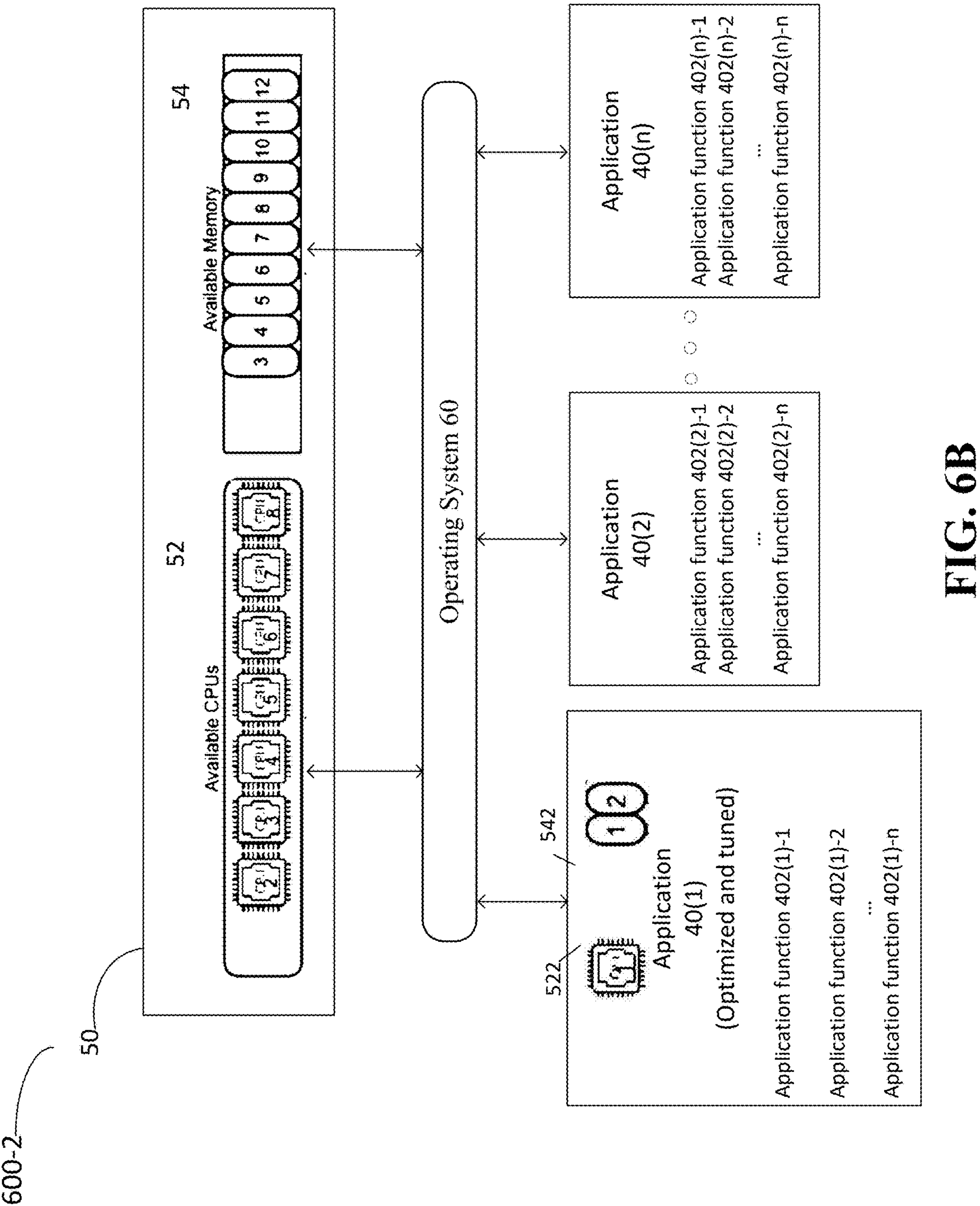
FIG. 6B illustrates an exemplary adjustment of resource to be allocated to the application function at a restart of the application based on the exemplary resource usage in FIG. 6A.

FIG. 6B illustrates an exemplary adjustment of resource allocation at a restart of the application 40(1) based on the exemplary resource usage shown in FIG. 6A. In the scenario 600-2 as shown in FIG. 6B, the portion of the reserved resource for application 40(1), which was used by the application function 402(1)-1 (the available CPU 522 and the memory resource 542 (with 1 and 2)), is maintained as resource reserved for application function 402(1)-1 after the restart. As illustrated, memory resources 54 (numbers 3 and 4) which were previously not used by any of the application functions 402(1)-2-402(1)-*n*, is returned to the available memory resources 54 and is not reserved for the application 40(1) anymore. This means this portion of resource that was previously reserved is released and available for use. Then the available resource 54 (numbers 3 through 12) may be allocated by operating system 60 to be utilized by other application(s) 40(1)-40(*n*) or other application function(s) 402(1)-1 to 402(*n*)-*n* to perform other task(s) in a manner as illustrated in FIG. 5A or FIG. 5B. In this way, the utilization of this portion of the reserved resource, which was wasted during the previous running of application function 40(1) in FIG. 5B, may be improved by the network traffic management apparatus 20. It is to be understood that such adjustment does not mean the application functions 402(1)-2-402(1)-*n* are disabled after the restart. Instead of having reserved resource when being executed, the application functions 402(1)-2-402(1)-n may be allocated with a part of the resource 50 when being executed, for example in a manner as illustrated in FIG. 5A. The determination or detection of the execution of any application functions 402(1)-2-402(1)-*n* may be performed by the network traffic management apparatus 20 (e.g., the Resource Usage Monitoring Unit 240) or some other component or device of the system. Therefore, application functions 402(1)-2-402(1)-*n* do not have a reserved resource anymore in scenario 600-2 but can be executed in a similar way as other applications, such as Application 40(2)-40(*n*) as shown in FIG. 5B. In this regard, resource allocated to the application functions 402(1)-2 through 402(1)-*n* in response to a detection of a corresponding execution may be more or fewer than the resources had been reserved for them previously. The specific amount of the resources allocated thereof may be determined for example, based on at least the actual needs of the application functions 402(1)-2-402(1)-*n*. It is to be understood that any of the application functions 402(1)-2-402(1)-*n* may regain reserved resource later. This may happen by way of example, when execution(s) of any of the application functions 402(1)-2-402(1)-*n* is monitored by the Resource Usage Monitoring Unit 240 and determined by the Resource Adjusting Unit 246 that reserving resource in advance may be needed. In some other examples, the Resource Adjusting Unit 246 may keep certain buffer and reserve more resource than the monitored actual resource usage. It is to be understood that how much buffer made during an adjustment may be a balance of expected resource usage of an application function to ensure certain performance and the degree of full utilization of the system resource.

It is to be understood that it is also possible that, different from the scenario 600-2 illustrated in FIG. 6, the resource usage data may indicate that the reserved resource is not sufficient to keep running of an application or application function. By way of example, in addition to two portions of CPU 52 and four portions of memory 54 that reserved for application 40(1), associated resource usage data may indicate that application function 402(1)-1 further used two more portions of CPU 52, or three more portions of memory 54 or both. This may happen due to for example a burst of traffic being processed by application function 402(1)-1 because such as more end users accessed the application 40 or the amount of end user did not change but the volume of traffic per end user increased during a previous running of the application 40(1). Therefore, such change caused the operating system 60 to allocate more resource to application function 402(1)-1 in a manner as illustrated in FIG. 5A. Then at a restart of application 40(1), the Resource Adjusting Unit 246 may take such change into account during its adjustment and reserve more resource for application 402(1)-1 to accommodate to the change.

Similarly, resource allocation may also be made for a new application function designed for performing a new task. As a non-limiting example, resource usage data may indicate that a new application function being executed (e.g., being executed more than certain number of times). Then at a restart of the associated application, the Resource Adjusting Unit 246 may determine whether to allocate (e.g., reserve) resource for this new application function. Therefore, by adjust resource to be allocated to application function(s) 402, the network traffic management apparatus 20 may scale up or scale down the resource allocated to application 40.

Moreover, because the network traffic management apparatus 20 performs the operations described in this disclosure on an application function basis, each application function may be allocated resource separately to execute a respective task. This behavior or characteristic allows the network traffic management apparatus 20 to not only prioritize among applications, but also among application functions of a single or a plurality of applications. As an example, a running application may provide HTTP related functions, DNS related functions, and TCP related functions. In an exemplary default configuration, resource may be reserved for this application and evenly allocated among those various functions. However, by executing operations described herein, the resource usage data may indicate that only DNS related functions have been executed or frequently executed. Then at a restart of the application, adjustment may be made automatically by the network traffic management apparatus 20 describe in this disclosure. For example, all or a part of the resource reserved for those HTTP and TCP related functions may be allocated to the DNS related functions or may be released and thereby reused by the system for other applications. In the former situation, the DNS related functions may be executed to process more transactions or data packets with the more reserved resource. This means those HTTP and TCP related functions are deprioritized from the resource usage perspective and no longer have reserved resources being allocated to them after the restart. In the latter situation, resource may be utilized for the system to process other task(s) and thereby resource usage is optimized. In some examples, depending on traffic pattern in specific scenario, the same application may have different resource usage pattern when running in different systems or platforms (e.g., due to different types of end users of the client devices 10(1)-10(*n*) in FIG. 1). Accordingly, the adjustment made to the resource allocation for the application function(s) of the same application by the network traffic management apparatus 20 may also different.

In some examples, adjustment made by the Resource Adjusting Unit 246 may relate to not only how much resource 50 to be allocated to an application function, but also the specific type. As a non-limiting example, for resource to be reserved for a specific application function, the Resource Adjusting Unit 246 may assign certain types of memory 54 (e.g., one or more types of memory object), the number of each type of memory 54 (e.g., the number of instances of a specific memory object). In other examples, the Resource Adjusting Unit 246 may further designate particular portion(s) of memory resource 54 for an application.

In some examples, the Resource Adjusting Unit 246 may make the adjustment based on a resource utilization rate of an application function. In this case, the Resource Adjusting Unit 246 may determine a resource utilization rate for an application function.

For example, in the scenario 600-1 illustrated in FIG. 6A, for the reserved resource pool comprising two portions of CPU 522 and memory 542 (numbers 1 through 4) for application 40(1), application function 402(1)-1 may have a 33% CPU usage and 50% memory usage, while application functions 402(1)-2-402(1)-*n* have zero usage. In a non-limiting example, the resource usage data can count the number of times the three portions of CPU 522 and memory 542(numbers 1 through 4) are used. The resource usage data can store the count as a resource use count. For example, the application function 402(1) may use the first portion of the CPU 522 (with the check mark) 50 times. The application function 402(1) may not use the second portion of CPU 522 (the CPU without a check mark). The application function may also use the memory resource 542 (number 1 with a check mark) 150 times along with 200 uses of memory resource 542 (number 2 with a check mark). The memory resources 542 (numbers 3 and 4) may have 0 times of use. The check marks illustrate which CPU 522 and memory resources 542 were used. In this case, predetermined threshold(s) may be used for the Resource Adjusting Unit 246 to determine the resource usage of an application function, for example a predetermined threshold to indicate a high or frequent use, another predetermined threshold to indicate a low or non-frequent use. Then the Resource Adjusting Unit 246 may further determine whether to reserve a resource for an application function. For example, 33% or higher usage by an application function of resource reserved for an application may be considered as a high usage, or a 60% or higher usage of the resource reserved for this specific application may be considered as a high usage. It is to be understood that the Resource Adjusting Unit 246 may have different predetermined thresholds but may also have a simply one predetermined threshold. Then for a high usage, the Resource Adjusting Unit 246 may reserve a resource for the application function (e.g., as illustrated in FIGS. 5B, 6A-6B). For a low usage, a resource allocation as illustrated in FIG. 5A may be used.

In some examples, the Resource Adjusting Unit 246 may detect a change of resource usage pattern for the application function over a time period by analyzing the stored resource usage data. In this case, a predetermined significance threshold may be set. Then if the Resource Adjusting Unit 246 detects a change exceeding the predetermined significance threshold, the Resource Adjusting Unit 246 may generate an alert indicating such change. Then the alert may be transmitted to a controller controlling the restart of the application. Alternatively, the Resource Adjusting Unit 246 may trigger a restart of the application automatically, for example, when determining a low-usage or no-usage situation of the application (e.g., no resource 50 is used by the application). In the former case, an operator or administrator may decide whether and when to restart the application. The restart of an application may also be scheduled based on resource usage pattern of the application function or the application. As an example, an application function or other application functions of the application may be frequently executed during a specific time period of a day. Then a restart may be scheduled to avoid that busy time period. As discussed above, it is to be understood that a restart of an application may happen due to operating error (e.g., crash), or pre-scheduled for maintenance, or by manual intervention due to a change of resource usage pattern (e.g., load characteristics).

Figure 7:
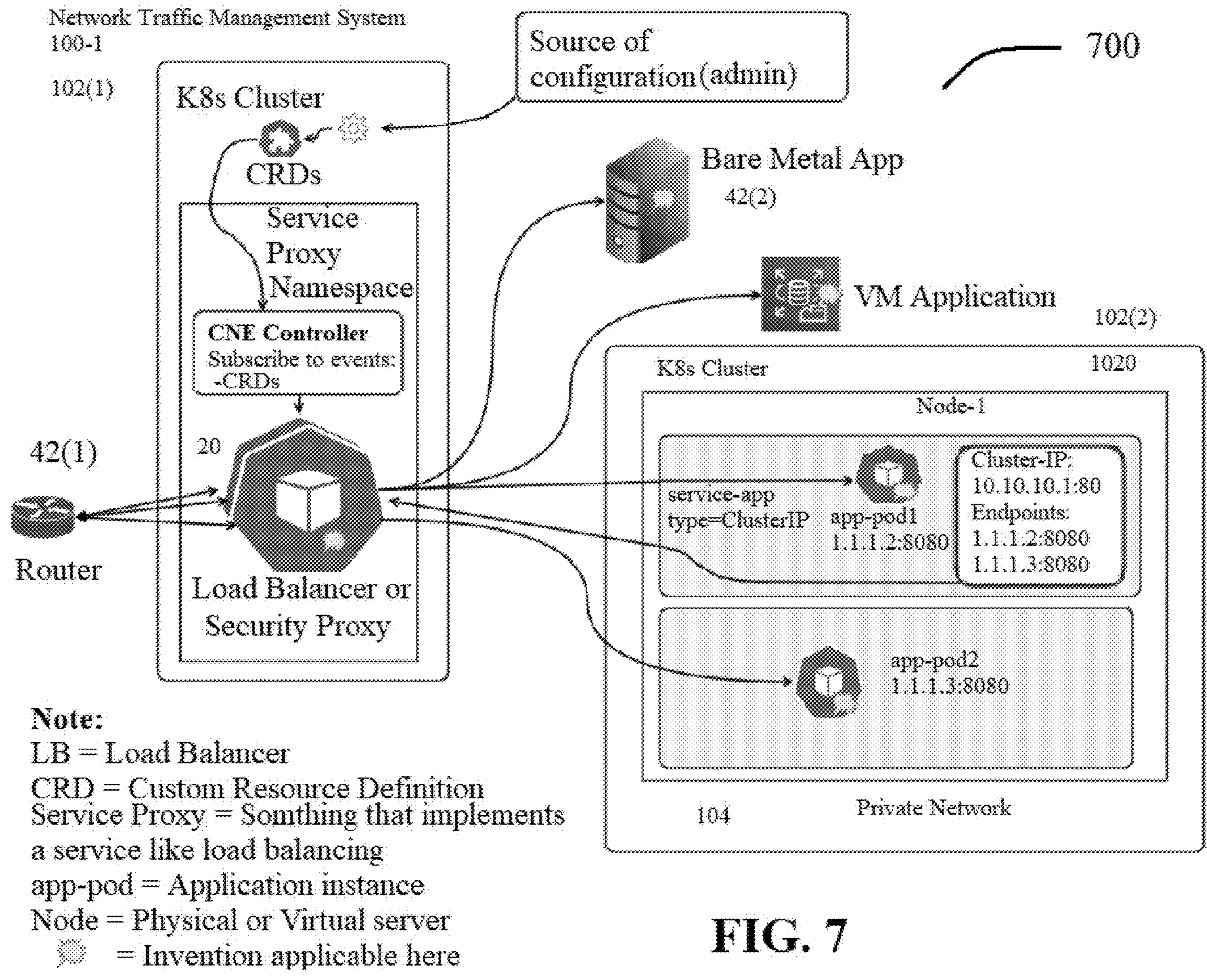
FIG. 7 illustrates an exemplary execution environment of the examples of the present disclosure.

FIG. 7 illustrates an exemplary execution environment of the examples of the present disclosure. As shown in FIG. 7, network traffic management system 100-1 is a Kubernetes based system comprising Kubernetes (also referred to K8) cluster 102(1), 102(2), wherein cluster 102(2) may comprise a cluster of master and worker nodes of a private network 104. In FIT. 7, only one node is illustrated for concise reason. A cluster of nodes 1020 may have a control plane that allocates and shares resources across the nodes. A working node may run an application or a plurality of applications at pod level. As discussed above, the network traffic management apparatus 20 may perform the operations discussed in this disclosure at an appropriate network component or device of a system. FIG. 7 marks exemplary places to implement the network traffic management apparatus 20. It is to be understood that the operations discussed herein may also be applied to other containerized systems. Taking K8 based system as an example, in such containerized environment, executions of applications and application functions are containerized, allowing more flexibility as for development and deployment (e.g., for testing, adjusting). Therefore, in such containerized environment, restart of an application may be more frequently as compared to traditional system environment. Therefore, containerized environment could be friendly environment to carry out the operations of this disclosure.

With implementations of all or part of the above discussed operations for optimizing resource usage of an application running in a network traffic management system, actual usage of execution resource by an application function may be monitored and resource usage data may be obtained and stored. At a restart of the application, resource allocated to an application function may be adjusted based on the stored associated resource usage data. In this way, an application function may be allocated a resource separately from other application functions of the application. Accordingly, resource allocation may be adjusted based on an actual use of each application function, which may be different from the original default configuration and allocation. Such automatic adjustment over time may keep and improve performance of the application function and the application, meanwhile resource usage may also be optimized. This would be advantageous when the development and deployment of an application or application function changes over time because the adjustment may accommodate to any changes monitored during a previous running of the application. In some examples, by analyzing resource utilization rate of an application function, resource may be reserved for a high usage. Therefore, a balance may be made among applications and different application functions and priorities of various tasks performed by different application functions may be made and adjustable. In this way, the system resource may be utilized in a faster and more efficient way thereby the resource usage may be optimized. Furthermore, by releasing previously unused CPUs, the system can also optimize power utilization.

Throughout the specification and claims, terms may have nuanced meanings suggested or implied in context beyond an explicitly stated meaning. It will be further understood that: the term "or" may be inclusive or exclusive unless expressly stated otherwise; the term "set" may comprise zero, one, or two or more elements; the terms "some", "another," and "particular" are used as naming conventions to distinguish elements from each other and does not imply an ordering, timing, or any characteristic of the referenced items unless otherwise specified; the terms "such as", "e.g.," "for example", and the like describe one or more examples but are not limited to the described examples(s); the term "comprises" and/or "comprising" specify the presence of stated features, but do not preclude the presence or addition of one or more other features.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an example is included in at least one example of the present solution. Thus, discussions of the features and advantages, and similar language, throughout the specification may, but do not necessarily, refer to the same example.

Furthermore, the described features, advantages and characteristics of the present solution may be combined in any suitable manner in one or more implementations or examples. One of ordinary skill in the relevant art will recognize, in light of the description herein, that the present solution can be practiced without one or more of the specific features or advantages of a particular implementation or example. In other instances, additional features and advantages may be recognized in certain implementations or examples that may not be present in all implementations of the present disclosure.

What is claimed is:

1. A method for optimizing resource usage of an application running in a network traffic management system, the method implemented by the network traffic management system comprising one or more network traffic management apparatuses, client devices, or network server devices, the method comprising:

monitoring a usage of execution resource by one of a plurality of application functions of the application during the running of the application to obtain resource usage data of the application function, the plurality of application functions being separately allocated resource for executing the plurality of application functions;

storing the resource usage data;

detecting a restart of the application; and in response to the detection of the restart of the application, retrieving the stored resource usage data of the application function and adjusting a resource to be allocated to the application function at the restart of the application based on the resource usage data.

2. The method of claim 1, further comprising:

allocating the adjusted resource to the application function of the application at the restart of the application for executing the application function.

3. The method of claim 1, wherein the adjusted resource to be allocated to the application function based on the resource usage data further comprising:

determining a resource utilization rate based on the retrieved resource usage data;

in response to the determined resource utilization rate being greater than a first predetermined threshold, allocating an additional resource reserved for the application to the application function at the restart of the application; and in response to the resource utilization rate being less than a second predetermined threshold, allocating fewer resources to the application function only when determining to execute the application function;

wherein, the first predetermined threshold is greater than or equal to the second predetermined threshold.

4. The method of claim 1, wherein the resource usage data comprise at least a resource use count of resource allocated to the application function, the method further comprising:

increasing the resource use count in response to detecting a use of the resource by the application function;

wherein adjusting the resource to be allocated to the application function at the restart of the application comprises:

adjusting the resource to be allocated to the application function at the restart of the application based on the count of the resource use.

5. The method of claim 1, further comprising:

analyzing a change of resource usage pattern of the application function over a time period based on the resource usage data of the application function; and in response to the change exceeding a predetermined significance threshold, generating an alert indicating the change exceeding the predetermined significance threshold and transmitting the alert to a controller controlling the restart of the application.

6. An apparatus for optimizing resource usage of an application running in a network traffic management system, comprising memory comprising programmed instructions stored in the memory and one or more processors configured to be capable of executing the programmed instructions stored in the memory to:

monitor a usage of execution resource by one of a plurality of application functions of the application during the running of the application to obtain resource usage data of the application function, the plurality of application functions being separately allocated resource for executing the plurality of application functions;

store the resource usage data;

detect a restart of the application; and in response to the detection of the restart of the application, retrieve the stored resource usage data of the application function and adjust a resource to be allocated to the application function at the restart of the application based on the resource usage data.

7. The apparatus of claim 6, wherein the one or more processors are further configured to:

allocate the adjusted resource to the application function of the application at the restart of the application for executing the application function.

8. The apparatus of claim 6, wherein the adjusted resource to be allocated to the application function based on the resource usage data further comprising:

determine a resource utilization rate based on the retrieved resource usage data;

in response to the determined resource utilization rate being greater than a first predetermined threshold, allocate an additional resource reserved for the application to the application function at the restart of the application; and in response to the resource utilization rate being less than a second predetermined threshold, allocate fewer resources to the application function only when determining to execute the application function;

wherein, the first predetermined threshold is greater than or equal to the second predetermined threshold.

9. The apparatus of claim 6, wherein the resource usage data comprise at least a resource use count of resource allocated to the application function, the one or more processors are further configured to:

increase the resource use count in response to detecting a use of the resource by the application function;

wherein adjusting the resource to be allocated to the application function at the restart of the application comprises:

adjust the resource to be allocated to the application function at the restart of the application based on the count of the resource use.

10. The apparatus of claim 6, wherein the one or more processors are further configured to:

analyze a change of resource usage pattern of the application function over a time period based on the resource usage data of the application function; and in response to the change exceeding a predetermined significance threshold, generate an alert indicating the change exceeding the predetermined significance threshold and transmit the alert to a controller controlling the restart of the application.

11. A non-transitory computer readable medium having stored thereon instructions for optimizing resource usage of an application running in a network traffic management system, comprising executable code which when executed by one or more processors, causes the one or more processors to:

monitor a usage of execution resource by one of a plurality of application functions of the application during the running of the application to obtain resource usage data of the application function, the plurality of application functions being separately allocated resource for executing the plurality of application functions;

store the resource usage data;

detect a restart of the application; and in response to the detection of the restart of the application, retrieve the stored resource usage data of the application function and adjust a resource to be allocated to the application function at the restart of the application based on the resource usage data.

12. The non-transitory computer readable medium of claim 11, wherein the one or more processors are further configured to:

allocate the adjusted resource to the application function of the application at the restart of the application for executing the application function.

13. The non-transitory computer readable medium of claim 11, wherein the adjusted resource to be allocated to the application function based on the resource usage data further comprising:

determine a resource utilization rate based on the retrieved resource usage data;

in response to the determined resource utilization rate being greater than a first predetermined threshold, allocate an additional resource reserved for the application to the application function at the restart of the application; and in response to the resource utilization rate being less than a second predetermined threshold, allocate fewer resources to the application function only when determining to execute the application function;

wherein, the first predetermined threshold is greater than or equal to the second predetermined threshold.

14. The non-transitory computer readable medium of claim 11, wherein the resource usage data comprise at least a resource use count of resource allocated to the application function, the one or more processors are further configured to:

increase the resource use count in response to detecting a use of the resource by the application function;

wherein adjusting the resource to be allocated to the application function at the restart of the application comprises:

adjust the resource to be allocated to the application function at the restart of the application based on the count of the resource use.

15. The non-transitory computer readable medium of claim 11, wherein the one or more processors are further configured to:

analyze a change of resource usage pattern of the application function over a time period based on the resource usage data of the application function; and in response to the change exceeding a predetermined significance threshold, generate an alert indicating the change exceeding the predetermined significance threshold and transmit the alert to a controller controlling the restart of the application.

16. A network traffic management system, comprising one or more traffic management apparatuses, network server devices, or client devices, the network traffic management system comprising memory comprising programmed instructions stored thereon and one or more processors configured to be capable of executing the stored programmed instructions to:

monitor a usage of execution resource by one of a plurality of application functions of the application during the running of the application to obtain resource usage data of the application function, the plurality of application functions being separately allocated resource for executing the plurality of application functions;

store the resource usage data;

detect a restart of the application; and in response to the detection of the restart of the application, retrieve the stored resource usage data of the application function and adjust a resource to be allocated to the application function at the restart of the application based on the resource usage data.

17. The network traffic management system of claim 16, wherein the one or more processors are further configured to:

allocate the adjusted resource to the application function of the application at the restart of the application for executing the application function.

18. The network traffic management system of claim 16, wherein the adjusted resource to be allocated to the application function based on the resource usage data further comprising:

determine a resource utilization rate based on the retrieved resource usage data;

in response to the determined resource utilization rate being greater than a first predetermined threshold, allocate an additional resource reserved for the application to the application function at the restart of the application; and in response to the resource utilization rate being less than a second predetermined threshold, allocate fewer resources to the application function only when determining to execute the application function;

wherein, the first predetermined threshold is greater than or equal to the second predetermined threshold.

19. The network traffic management system of claim 16, wherein the resource usage data comprise at least a resource use count of resource allocated to the application function, the one or more processors are further configured to:

increase the resource use count in response to detecting a use of the resource by the application function;

wherein adjusting the resource to be allocated to the application function at the restart of the application comprises:

adjust the resource to be allocated to the application function at the restart of the application based on the count of the resource use.

20. The network traffic management system of claim 16, wherein the one or more processors are further configured to:

analyze a change of resource usage pattern of the application function over a time period based on the resource usage data of the application function; and in response to the change exceeding a predetermined significance threshold, generate an alert indicating the change exceeding the predetermined significance threshold and transmit the alert to a controller controlling the restart of the application.

* * * * *